Dec. 8, 1953     A. L. STALEY     2,662,152
APPARATUS FOR MAKING LUBRICATION FITTINGS
Filed Aug. 18, 1948     4 Sheets-Sheet 1

Dec. 8, 1953   A. L. STALEY   2,662,152
APPARATUS FOR MAKING LUBRICATION FITTINGS
Filed Aug. 18, 1948   4 Sheets-Sheet 2

INVENTOR
Austin L. Staley

Dec. 8, 1953  A. L. STALEY  2,662,152
APPARATUS FOR MAKING LUBRICATION FITTINGS
Filed Aug. 18, 1948  4 Sheets-Sheet 3

INVENTOR
Austin L. Staley

Fig.6.

Patented Dec. 8, 1953

2,662,152

UNITED STATES PATENT OFFICE 2,662,152

APPARATUS FOR MAKING LUBRICATION FITTINGS

Austin L. Staley, Fox Chapel, Pa., assignor to Universal Lubricating Systems, Inc., Oakmont, Pa., a corporation of Delaware Application August 18, 1948, Serial No. 44,881

5 Claims. (Cl. 219—4)

This invention relates to apparatus for making lubrication fittings. It has to do with apparatus for making lubrication fittings of the type disclosed in my copending application Serial No. 790,375, filed December 8, 1947, now abandoned and by the methods disclosed in my Patent No. 2,566,505 granted September 4, 1951.

I provide apparatus for making lubrication fittings whereby fittings having a body and a tip welded to the body may be fabricated at high speed and at extremely low cost. The tips made by use of my apparatus are of superior quality.

I provide apparatus for making lubrication fittings comprising a work holder and a series of instrumentalities opposite which successively the work holder is adapted to be positioned, the work holder being angularly movable to present selected differently oriented portions of work held by the work holder to be successively acted upon by said instrumentalities. Desirably I provide a rotatable member and the work holder is carried by that member and successively positioned opposite the respective instrumentalities upon rotation of that member.

I further provide apparatus for making lubrication fittings comprising a work holder and a drill and a welder opposite which successively the work holder is adapted to be positioned, the work holder being angularly movable to present selected differently oriented portions of work held by the work holder to be successively drilled and welded by said drill and welder. I desirably employ a series of work holders which may be carried by a rotatable member, the respective work holders being adapted to be positioned opposite a series of instrumentalities successively upon rotation of that member.

I also provide apparatus for making lubrication fittings comprising a work holder and a drill and a welder opposite which successively the work holder is adapted to be positioned to present a portion of a lubrication fitting body held by the work holder to be successively drilled by the drill and acted upon by the welder, the welder including an electrode for engagement with the lubrication fitting body held by the work holder, means for positioning a tip against the body and means for passing an electric current through the tip and body and said electrode to weld the tip to the body.

I also provide apparatus for making lubrication fittings comprising a series of work holders, a welder, means for moving the work holders to bring them successively into cooperative relationship with the welder to present portions of lubrication fitting bodies held respectively by the work holders to be acted on by the welder and a tip feeder delivering a tip to each lubrication fitting body held by a work holder when in cooperative relationship with the welder, the welder having means for welding together each such assembled body and tip.

Other details, objects and advantages of the invention will become apparent as the following description of certain present preferred embodiments thereof proceeds.

In the accompanying drawings I have shown certain present preferred embodiments of the invention in which.

My apparatus comprises means for holding a lubrication fitting body at a desired angle, means for bringing a tip into contact with the body at a desired position on the body and means for joining the tip to the body. The joining is preferably accomplished by welding and I find that electric resistance welding is effective and efficient; I prefer to employ the kind of electric resistance welding known to those skilled in the art as projection welding. I relatively shape the lubrication fitting body and tip so that the assembly of body and tip when the body and tip are ready to be welded together has minimum cross-sectional area at the zone of juncture between the body and tip. While the body and tip are being welded together I press them firmly into contact with each other. The passage of electric current through the thus assembled and pressed together body and tip results in melting of metal at the zone of juncture between the body and the tip because the cross-sectional area of the assembly is smallest at that zone, resulting in maximum resistance in the electrical circuit and hence maximum temperature. The application of maximum temperature at the zone of smallest cross-sectional area results in melting of metal at that zone while the remainder of the assembly remains unmelted. The tips are preferably hardened before being welded to the fitting bodies. While the welding heat anneals the end of the tip which is welded to the fitting body it does not anneal the opposite end of the tip which is the end to which the coupler is applied when lubricant is injected through the fitting and that end of the tip remains in its hardened condition.

As above mentioned, during welding the lubrication fitting body and tip are pressed together. Since metal at the zone of juncture melts during the welding there is an appreciable movement together or consolidation of the body and tip during the small fraction of a second during which the metal at the zone of juncture is molten so that the final relative position of the welded together body and tip is somewhat different from their relative position when assembled before the welding current has been passed through them. The result is a zone of juncture between the body and tip in the finished fitting which is of materially increased cross section relatively to the cross section at the zone of juncture prior to welding and which forms a unitary lubrication fitting of great strength and ruggedness. Tests have shown that the joint between the body and tip is so strong that it does not yield under tests of the fittings to destruction, the fittings being destroyed elsewhere than at the joint between the body and tip. My process is extremely economical; I can make superior fittings at a fraction of the cost of making fittings by methods heretofore employed. It has heretofore been the usual practice to thread the tips into the fitting bodies. This practice has been recognized as disadvantageous from various standpoints, yet it is the practice which has been employed by the industry right up to the present invention. The making of fittings by threading the tip into the body has the disadvantages that a relatively weak fitting is produced, the time required for manufacture is relatively great and the cost of making the fitting is relatively high. Fittings with threaded-in tips when subjected to tests such as the tests above referred to normally yield at the threads between the tip and body. Moreover, fittings made by threading the tip into the body are frequently defective due to imperfect threads in the tip, the body or both; this may lead to leakage or separation of the tip from the body when the fitting is used.

My method has especial utility and advantage in the making of fittings of different "angles." The fittings are applied to machinery of various kinds, as, for example, automobiles, to deliver lubricant to bearings. Many fittings when so applied are accessible only from a particular angle to the axis of the fitting body. For such installations fittings are employed which have the tip disposed at an angle to the axis of the fitting body. These are so-called "angle" fittings which have the tips disposed at angles to the fitting bodies such as 30°, 45°, 60°, 90°, etc.

I preferably arrange the instrumentalities employed in making the fittings so that they may be disposed at fixed stations to operate in a uniform manner in the making of tips of different angles. For example, I may employ a drill for drilling a lubricant delivery passage in a fitting body and a welder for welding a tip to the fitting body and I may mount the fitting body in a work holder and move the work holder relatively to the drill and welder, stopping it briefly at each station for performance of the operation carried out at that station. To provide for making fittings of different angles I may arrange the fitting body in the work holder at a selected one of a plurality of different angles, the angle at which the body is disposed in the work holder being, of course, related to the "angle" of the fitting. Thus by adjustment of the work holder to hold fitting bodies at different angles I can without any other change in the apparatus make a set or series of fittings with the tips disposed at different angles to the bodies thereof. The respective fittings of the set or series are adapted for use where access to the fittings is from different angles as explained above. By my method I effect great economy of production. I can in a very short time make the necessary adjustment for changing over from the manufacture of fittings of one angle to the manufacture of fittings of another angle.

I find it advantageous to employ a plurality of work holders for holding fitting bodies and to move the work holders successively to a drilling station and a welding station; in this way I can manufacture fittings with unprecedented speed and I can, if it should be desired to do so, make fittings of more than one "angle" at the same time. For example, the work holders may be mounted on a rotary table and the drilling and welding stations may be spaced about the periphery of the table. Conveniently the table may be mounted to rotate about a vertical axis so that the path of the work holders is a circular path in a horizontal plane. Desirably the work holders are spaced apart a distance such that when one work holder is disposed at the drilling station another work holder will be disposed at the welding station; thus a drilling and a welding operation may be performed on different fitting bodies at the same time. The table is preferably rotated step by step, stopping to position the respective work holders at the respective stations for performance of the respective operations.

I can perform the operations so rapidly that I find it desirable to employ more than one drilling station and more than one welding station. I advance the table between operations a distance equal to as many times the distance between work holders as there are sets of drills and welders. If, for example, two drills and two welders are employed the table is advanced twice the distance between work holders upon each step. Thus upon each angular advance or indexing of the table one work holder will pass the first drill to have its fitting body operated on subsequently by the second drill and one work holder will pass the first welder to have its fitting body operated on subsequently by the second welder. It would be possible to position the two drills side by side to act on fitting bodies carried by successive work holders and to similarly position the welders but I find it desirable to arrange the drills and welders alternately, carrying alternate work holders past the first drill and the first welder without having their fitting bodies operated on thereby so that those fitting bodies are operated on by the second drill and the second welder simultaneously with drilling and welding operations being performed by the first drill and the first welder on other fitting bodies.

Referring now more particularly to the drawings, the table is designated by reference numeral 2. It is of circular shape and is mounted in turn about a vertical axis 3. There are mounted on the table adjacent the periphery thereof a number of work holders designated generally by reference numeral 4. The work holders are preferably spaced apart equally around the complete periphery of the table. In the embodiment shown in the drawings there are twenty-four work holders disposed about the periphery of the table spaced apart at angles of 15°. Means are provided for advancing the table step by step to bring each work holder into cooperative relationship first with a drill and thereafter with a welder. If there were only one drill and one welder the table would rotate or index only 15° between stops. However, in the embodiment shown there are two drills and two welders so the table rotates 30° between stops.

Figure 1:
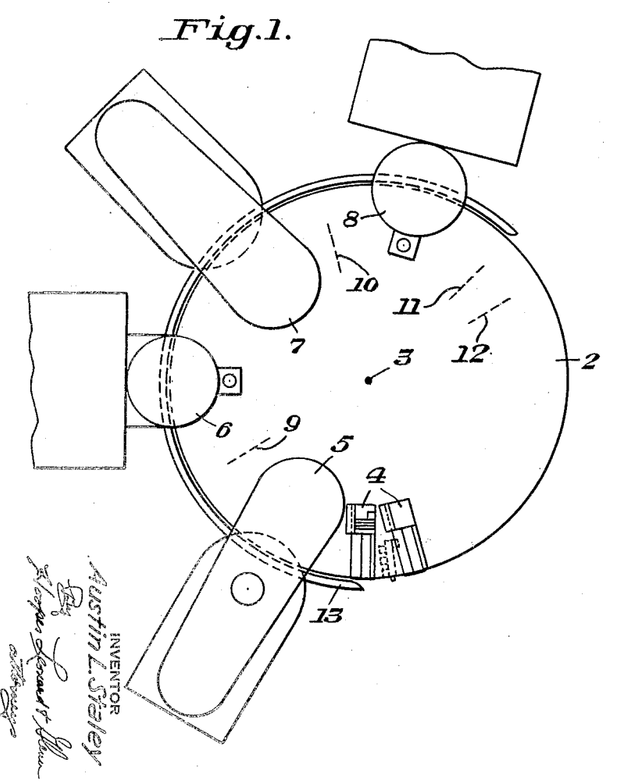
Figure 1 is a fragmentary diagrammatic plan view of apparatus for making lubrication fittings.

In Figure 1 the first drill is designated generally by reference numeral 5, the first welder by reference numeral 6, the second drill by reference numeral 7 and the second welder by reference numeral 8. Similarly the reference numerals 5, 6, 7 and 8 will be used to refer to the first drilling station, the first welding station, the second drilling station and the second welding station respectively.

The angular distance between the first drill and the first welder and between the second drill and the second welder is 60°. Thus it will be seen that as the table advances 30° between operations the first welder will act on the same fitting bodies as have been acted on by the first drill and the second welder will act on the same fitting bodies as have been acted on by the second drill. The angular distance between the first welder and the second drill is 45°. Thus the fitting bodies which have been acted on by the first drill and the first welder will by-pass the second drill and the second welder, and the fitting bodies which are to be acted on by the second drill and the second welder will by-pass the first drill and the first welder. Thus the provision of the two sets of drills and welders doubles the output of the machine relatively to the output which could be effected with but one drill and one welder. Similarly the output would be further increased by increasing the number of sets of drills and welders.

Half way between the first drill and the first welder is a clean-out station 9 and half way between the second drill and the second welder is a clean-out station 10. These clean-out stations are jets which blow air into the passages formed in the fitting bodies by the drills to blow out the chips and cuttings.

Viewing Figure 1, the table 2 turns clockwise during operation. After the drilling and welding operations have been performed on the work carried by each work holder the finished tips are ejected at ejecting stations 11 and 12. The fittings are ejected by blasts of compressed air which operate at both of stations 11 and 12 at the same time.

There is disposed about 225° of the periphery of the table a stationary cam 13 for operating the work holders as will now be described. Each of the twenty-four work holders 4 comprises a supporting base 14 bolted to the table 2 by bolts 15. The respective supporting bases 14 hence are in effect integral with the table and have no movement relative thereto. Each of the bases 14 has therein an upwardly open arcuate slot 16 into which fits a tongue 17 integral with the body 18 of the work holder. The base 14 has an arcuate upwardly facing surface 19 beside the arcuate upwardly facing slot 16 and the body 18 has an arcuate lower surface 20 adapted to seat against the surface 19 while the tongue 17 is disposed in the slot 16. There are drilled through the base 14 intersecting the slot 16 a series of bolt holes 21 and the tongue 17 of the body 18 also has therethrough a bolt hole 22 adapted in adjusted positions of the body 18 relatively to the base 14 to be aligned with a desired bolt hole 21. A bolt 23 provided with a nut 24 is adapted to be passed through the thus aligned bolt holes 21 and 22 to hold the body 18 at a desired angle relatively to the base 14. The bolt holes in the base may be disposed so as to hold the body at any desired angles to the base. Those angles may be selected at will and will ordinarily be such as to provide for the welding of the tips to the lubrication fitting bodies at the angles necessary to produce "angle" fittings having the desired angular relationships between the bodies and tips thereof.

Ordinarily the body 18 of each work holder will be fixed at a particular angle during a run of the machine whereby to make fittings all of one angle during that run. To make fittings of other angles the bolt 23 is removed, the body 18 adjusted to the desired new angle relatively to the base 14 and the bolt re-inserted and tightened. This change can be effected in a very short time.

Each work holder body 18 has therein a bore 25 through which passes a stud 26. Each work holder also has a clamping jaw 27 which is pivotally mounted on the stud 26. Thus the clamping jaw 27 of each work holder is adapted to partake of pivotal movement about the axis of the corresponding stud 26 relatively to the work holder body 18. Each work holder body 18 has adjacent its upper end a bore 28 receiving a compression coil spring 29 and a pin 30 having a rounded end, the pin 30 being adapted to bear against the clamping jaw 27 to turn the clamping jaw in the clockwise direction about the axis of the stud 26, viewing Figure 3. The spring 29 normally urges the clamping jaw 27 to open position.

The body 18 of each work holder and the corresponding clamping jaw 27 have adjacent their upper ends work receiving cavities 31 and 32 respectively which may be complementarily formed to hold the work to be acted on. When the work to be acted on consists of lubrication fitting bodies the cavities 31 and 32 are shaped so that when a lubrication fitting body is positioned between the body 18 of the work holder and the clamping jaw 27 at the elevation of the cavities 31 and 32 and the jaw is moved to closed position the fitting body will be firmly held by the work holder with a desired portion exposed to be acted on by the drill and welder. The fitting bodies for which the particular form of apparatus shown in the drawings is designed have threaded shanks and bulbous heads. The heads may be spherical or of other shape. Each of the work holders holds one of the fitting bodies so as to present its bulbous head to be drilled and to have a tip applied and welded thereto as will be described.

The spring 29 normally maintains the clamping jaw 27 of each of the work holders 4 in open or inoperative position. Each of the work holder bodies 16 has at a level below the level of the axis of the stud 26 a bore 33 having at its inner end a counterbore 34. A piston 35 fits in the bore 33 and has an extension 36 fitting in the counterbore 34 and adapted to project beyond the end thereof. The bore 33 functions as a cylinder. The piston 35 is sealed in the cylinder 33 by packing 37 held in place on the piston by a nut 38 threaded onto a stud 39 forming part of the piston and a washer 40. The cylinder 33 is adapted to be closed and sealed by a threaded plug 41 and a gasket 41'.

Figure 3:
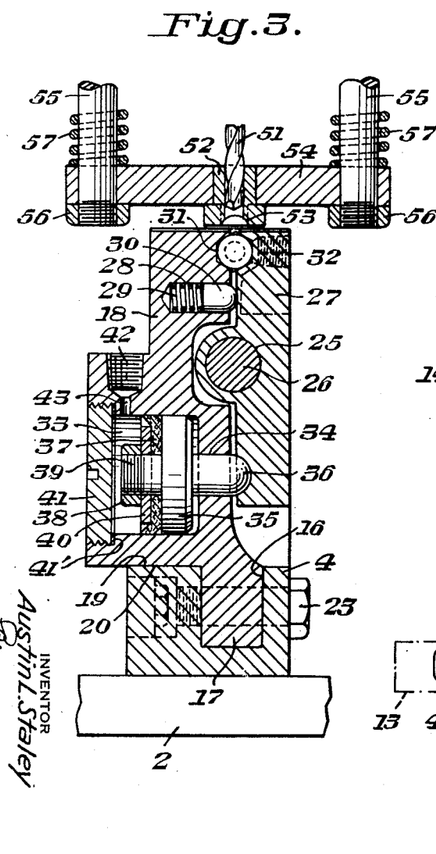
Figure 3 is a fragmentary vertical cross-sectional view to enlarged scale through a work holder and drill head of the apparatus shown in Figure 1.

Communicating with the cylinder 33 behind or to the left of the piston 35, viewing Figure 3, is a port 43 leading to an internally threaded bore 42. A connection leading to a source of fluid under pressure, such as compressed air, is adapted to be threaded into the bore 42. When compressed air or another fluid under pressure is admitted through the bore 42 and port 43 it forces the piston 35 to the right, viewing Figure 3, and turns the clamping jaw 27 in the counterclockwise direction about the axis of the stud 26 to move the clamping jaw to operative or clamping position relatively to a lubrication fitting body to be held by the work holder to be acted on by one of the drills and one of the welders.

Figure 4:
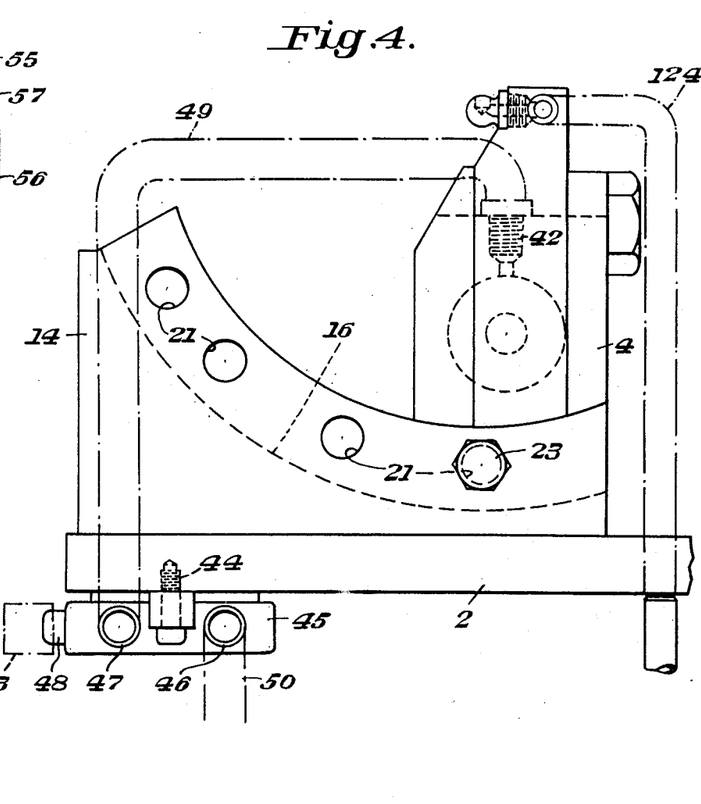
Figure 4 is a fragmentary radial elevational view of one of the work holders showing the mechanism for operating the clamp and showing the means for ejecting a finished fitting from the work holder.

Fastened by one or more bolts 44 to the undersurface of the table 2 for cooperation with each of the work holders 4 or each of a number of groups of work holders into which the work holders may be divided is an air valve 45 having an air inlet 46 for compressed air, a compressed air outlet 47 and a valve plunger 48. When the plunger 48 is forced to the right, viewing Figure 4, air under pressure is admitted from the inlet 46 to the outlet 47 whence it passes through a tube 49 to the bore 42 of the work holder or the bores 42 of the work holders of a group of work holders with which that particular air valve 45 is associated. I prefer to employ one air valve 45 for each two adjacent work holders 4, there being two tubes or branches 49 from each such valve to the respective bores 42 of those two work holders. Thus each air valve operates two work holders simultaneously.

As the table 2 rotates about the axis 3 the plungers 48 of the respective air valves 45 are successively pressed inwardly and held in by the stationary cam 13 so that the clamping jaws 27 of the work holders are by compressed air held in operative position to firmly clamp lubrication fitting bodies to be drilled and welded during positioning of the bodies to the respective drill and welder which are to operate on them. When each air valve 45 passes beyond the end of the stationary cam 13 as the table turns in the clockwise direction, viewing Figure 1, the plunger 48 thereof is released and is moved outwardly or to the left, viewing Figure 4, by a spring within the valve casing which shuts off passage of compressed air from the inlet 46 to the outlet 47 and relieves the air pressure in the tubes 49, resulting in releasing of the clamping jaws 27 of the two work holders controlled by that valve. The springs 29 open the jaws of those work holders, providing for ejection of the finished lubrication fittings.

Tubes 50 extend from the respective air inlets 46 of the twelve air valves 45 to an air inlet manifold disposed with its intake in the axis 3 and with twelve branches connected respectively with the twelve air inlets 46 of the twelve air valves 45 by twelve tubes 50. The manifold turns with the table 2 about the axis 3, the joint at the intake of the manifold being packed to prevent leakage during turning.

The drills at the two drilling stations 5 and 7 may be the same and the welders at the two welding stations 6 and 8 may be the same so description of one of each will suffice. The details of the mechanism for operating the drills and welders form no part of the present invention and hence are not shown.

Figure 3 shows all that is necessary to disclose the mounting and operation of the drills. At each of the drilling stations 5 and 7 there is mounted a drill 51 with appropriate mechanism for turning it, as, for example, an electric motor (not shown). Each drill is guided within a bushing 52 having a cup-shaped indentation 53 in its bottom surface coaxial with the drill 51, the indentation 53 being adapted upon lowering of the drill to seat on the bulbous or spherical portion or ball of the lubrication fitting body held in the work holder 4 which is positioned below the drill at the time the drill is lowered to operate thereon. The bushing 52 is mounted in a crosshead 54 through the opposite ends of which pass supporting rods 55 having nuts 56 on their lower extremities. Normally the crosshead 54 rests on the nuts 56 and is resiliently pressed downwardly thereagainst by compression coil springs 57, one surrounding each of the rods 55, bearing against any suitable portion of the apparatus (not shown).

When one of the work holders 4 is in position at one of the drilling stations 5 and 7 the drill at that station, including all the mechanism shown in Figure 3 above the work holder, is lowered. The cup-shaped indentation 53 in the bottom surface of the bushing 52 seats on the ball of the lubrication fitting body held by the work holder. This arrests downward movement of the crosshead 54. However, the drill 51 continues its downward movement and of course continues its rotation. Since the bushing is mounted in the crosshead 54 whose downward movement is arrested the drill passes down through the bushing. It drills a lubricant delivery passage in the bulbous end of the lubrication fitting body, being guided by the bushing 52 which in turn is centered relatively to the body of the fitting by seating of the cup-shaped indentation 53 on the bulbous portion of the lubrication fitting body.

As soon as the lubricant delivery passage has been drilled the drill is withdrawn upwardly, the bushing 52 pressing downwardly on the lubrication fitting body during upward withdrawal of the drill from the drilled passage therein. After the drill has been completely withdrawn from the lubrication fitting body the nuts 56 engage the undersurface of the crosshead 54 and draw the crosshead upwardly to disengage the lubrication fitting body held by the work holder. Thereupon the table 2 rotates or indexes in the clockwise direction, viewing Figure 1, through an angle of 30° whereupon it stops to position at each station the second work holder following the work holder just previously positioned thereat. In this way, as explained above, the lubrication fitting bodies in all of the work holders are operated upon, alternate ones at one set of operation stations and the other alternate ones at the other set of operating stations.

At each stop of the table 2 a work holder carrying a drilled lubrication fitting body is positioned at each of the clean out stations 9 and 10. At each of those stations a compressed air nozzle is positioned which blows compressed air downwardly into the lubricant delivery passage which has just been drilled into the lubricant fitting body to expel the cuttings and chips. The cuttings and chips may be expelled through the threaded shank of the fitting body if there is no ball check valve in the body at the time; but normally the lubrication fitting bodies will have been provided with ball check valves and springs prior to their being operated upon by the mechanism disclosed in this application. Under those circumstances the cuttings and chips will be expelled upwardly from the just drilled lubricant delivery passage.

The lubrication fitting bodies prior to being acted upon by the apparatus disclosed in this application are each preferably drilled axially from one end to provide a passage ending within the bulbous portion, and the lubricant delivery passages drilled by the apparatus disclosed in this application intersect the first mentioned passages within the bulbous portions of the fitting bodies.

Figures 2, 7:
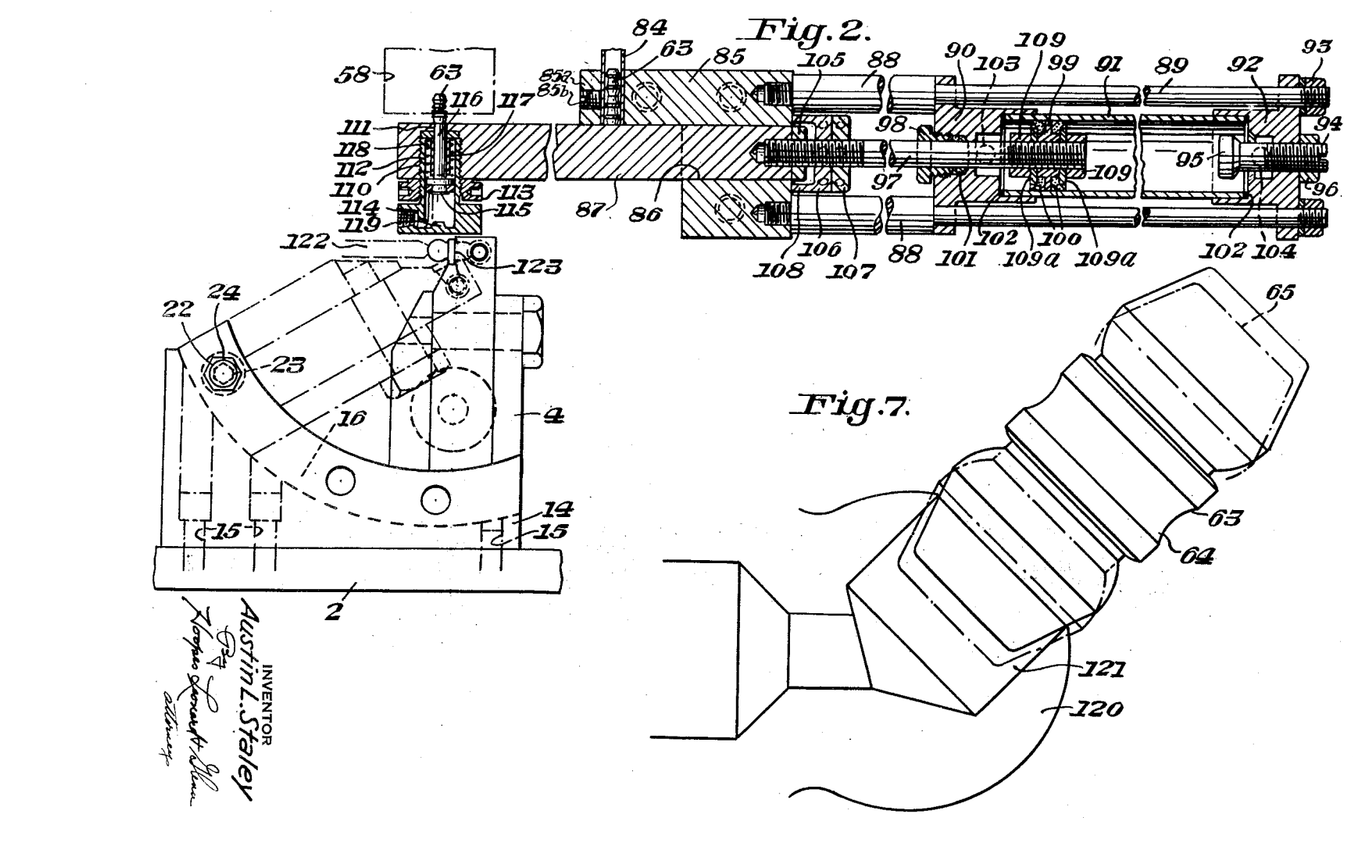
Figure 2 is an enlarged fragmentary view partly in vertical cross section taken radially through the apparatus shown in Figure 1 and through one of the welders.
Figure 7 is a diagram illustrating how a tip is welded to a lubrication fitting body by the projection welding method which I prefer to employ.
Figure 5:
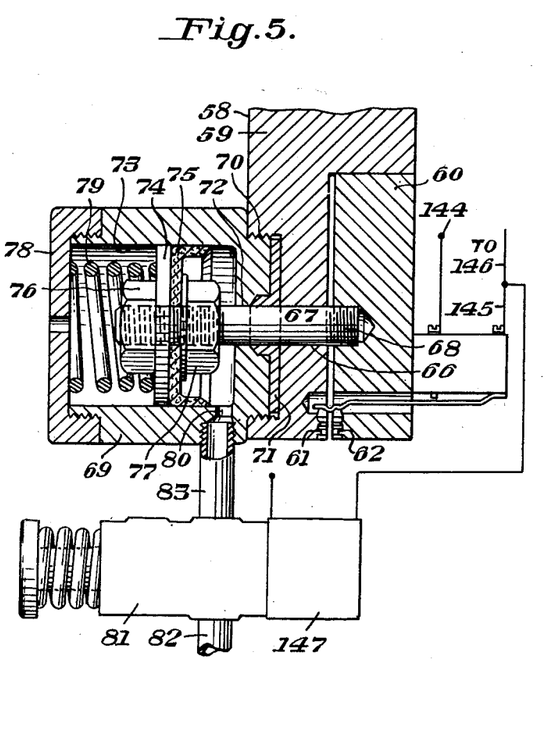
Figure 5 is a fragmentary vertical cross-sectional view through one of the tip holders for applying to a lubrication fitting body a tip to be welded thereto.

At each of the welding stations 6 and 8 there is a welder having an upper head or tip holder as shown in Figure 5. The upper head is designated generally by reference numeral 58 and comprises a body 59 and a clamping jaw 60. The body and clamping jaw have complementary recesses 61 and 62 respectively adapted to cooperate when the clamping jaw 60 is in operative position relatively to the body 59 to hold a tip to be applied and welded to the drilled lubrication fitting body. In Figure 7 one form of tip is shown to greatly enlarged scale, the tip being designated generally by reference numeral 63 and comprising a central portion 64 and identical tapered end portions 65. The tip has a lubricant delivery passage drilled axially completely therethrough from end to end. The tip is longitudinally symmetrical so that it is immaterial which end is disposed against the lubrication fitting body. The recesses 61 and 62 are shaped to clamp one of the tips 63 with either end upwardly since the ends of each tip are identical. The recesses engage the upper end of the tip, the lower end projecting downwardly from the upper head 58.

The body 59 of the upper head 58 is drilled at 66 to slidably receive a bolt 67 whose threaded end 68 is screwed onto the clamping jaw 60. A hollow extension member 69 is threaded into the body 59 at 70 and is sealed thereto by a gasket 71. The member 69 has a bore 72 slidably receiving the bolt 67. The member 69 has a cylinder 73 formed internally thereof and a piston 74 fits within the cylinder and is fastened to the bolt 67. Packing 75 seals the piston in the cylinder. The piston and packing are maintained in place on the bolt by nuts 76 and 77. The hollow extension member 69 is closed by a cap 78 threaded thereto and a compression coil spring 79 bears between the cap 78 and the piston 74. A port 80 communicates with the space within the cylinder 73 to the right of the piston 74 viewing Figure 5.

There is provided in connection with each upper head 58 a solenoid operated air valve 81 to which compressed air is delivered through an air inlet 82. A conduit 83 extends from the valve 81 to the port 80 in the cylinder 73. When the valve 81 is opened compressed air passes from the inlet 82 through the valve and the conduit 83 and the port 80 to the cylinder 73 to the right of the piston 74, viewing Figure 5.

Admission of air under pressure into the cylinder 73 to the right of the piston 74, viewing Figure 5, causes closing of the clamping jaw 60 against the body 59 to clamp a tip to be applied to a lubricant fitting body held in one of the work holders 4.

Tips are delivered to each head 58 one by one (one for each indexing movement of the table 3). The tips are fed down a hopper tube 84 the diameter of which is only slightly greater than the maximum diameter of the tips so that the tips follow each other in single file through the hopper tube and when delivered from the bottom of the tube are properly oriented. The bottom of the hopper tube is in the same horizontal plane as the bottom of an upper extension 85a of a part 85 of the machine which has therein a guideway 86 for guiding for slidable reciprocation or oscillation a slide 87. The hopper tube 84 is mounted in the extension 85a and held in place therein by a set screw 85b.

Threaded into the machine part 85 at the right hand face thereof, viewing Figure 2, are rods 88 having reduced end portions 89. A bracket 90 is disposed over the portions 89 of the rods 88 and against the shoulders of those rods between the portions 88 and 89 thereof. A sleeve 91 bears against the bracket 90 and another bracket 92 bears against the sleeve 91. The portions 89 of the rods 88 also pass through the bracket 92 and have nuts 93 applied to their ends for pressing the bracket 92 against the sleeve 91 and in turn pressing the sleeve 91 against the bracket 90. Threaded through the bracket 92 is a bolt 94 having a head 95 serving as a stop member as will presently be described. A lock nut 96 maintains the bolt 94 in adjusted position relatively to the bracket 92.

Threaded into the slide 87 is a rod 97. The rod 97 is guided within a bushing 98 threaded into the bracket 90. The end of the rod 97 is disposed in the sleeve 91 and carries a piston 99 packed against the interior of the sleeve by packing 100. Packing 101 seals the rod 97 where it passes through the bushing 98. Gaskets 102 are disposed between the ends of the sleeve 91 and the respective brackets 90 and 92. Thus the sleeve 91 is sealed and acts as a cylinder within which the piston 99 operates. Compressed air inlets 103 and 104 are provided at the opposite ends of the cylinder. When air is admitted through the inlet 103 the piston 99 moves to the right carrying with it the rod 97 and the slide 87. When compressed air is admitted to the cylinder through the inlet 104 the piston 99 moves to the left carrying with it the rod 97 and the slide 87.

The rod 97 is locked to the slide 87 by a lock nut 105. Threaded onto the rod 97 is a stop member 106 maintained in desired adjusted position by a lock nut 107. The stop member 106 has a circumferential flange 108 which extends about the lock nut 105. Movement of the slide 87 to the left, viewing Figure 2, is limited when the stop member 106 engages the right-hand face of the machine part 85. Movement of the slide 87 to the right, viewing Figure 2, is limited when the end of the rod 97 engages the stop 95. The piston 99 and packing 100 are maintained in place on the rod 97 by nuts 109 and washers 109a.

The slide 87 has adjacent its left-hand end, viewing Figure 2, a bore 110 extending upwardly thereinto from the bottom and a counterbore 111 thereabove communicating with the bore 110 and intersecting the upper surface of the slide. The bore 110 is internally threaded and a cylinder 112 is screwed thereinto. The cylinder 112 is maintained in adjusted position in the bore 110 by a nut 113 threaded over the cylinder below the slide 87 and biased against the under surface of the slide. The cylinder 112 has a compressed air inlet 114 at the bottom through which compressed air may be admitted for a purpose to be presently described.

A piston 115 operates in the cylinder 112. The piston 115 has an extension 116 which passes upwardly through the counterbore 111. The extension 116 is guided within a bushing 117. The bushing 117 limits upward movement of the piston 115 by engagement with the upper surface of the piston. The piston is designed so that when it is in its extreme upper position against the bushing 117 the upper surface of the extension 116 is approximately flush with the upper surface of the slide 87. A compression coil spring 118 is disposed between the bushing 117 and the cylinder 112 and normally urges the piston 115 downwardly. The piston 115 is moved upwardly by compressed air admitted to the cylinder 112 below the piston through the inlet 114.

The purpose of the slide 87 is to deliver tips 63 one by one from the hopper tube 84 to the upper head 58. When the upper head is in its lower position to cooperate with a work holder 4 positioned therebelow the slide 87 is in its extreme retracted position, i. e., the position it occupies when the right-hand end of the rod 97 is against the stop 95, viewing Figure 2. The stop 95 is adjusted so that when the right-hand end of the rod 87 engages it the counterbore 111 is coaxial with the hopper tube 84. At that time compressed air is not admitted through the inlet 114 so the spring 118 pushes the piston 115 down to the bottom of the cylinder 112. In the bottom of the cylinder 112 is a stop 119 against which the bottom of the piston 115 engages when the piston is in its lowermost position. At that time the upper surface of the extension 116 is disposed a distance below the upper surface of the slide 87 approximately equal to the length or vertical dimension, viewing Figure 2, of one of the tips 63. Thus when the slide 87 is in its retracted position with the counterbore 111 coaxial with the hopper tube 84 the piston 115 is at the bottom of its stroke in the cylinder 112 and the lowermost tip 63 in the hopper tube 84 drops down into the counterbore 111 and rests on the top of the extension 116. The upper surface of the tip when in the counterbore 111 is approximately flush with the upper surface of the slide 87.

Compressed air is admitted to the cylinder 91 through the inlet 104 driving the piston 99 to the left, viewing Figure 2, until the stop member 106 engages the right hand face of the machine part 85. At that time the counterbore 111 is substantially coaxial with the tip holder in the upper head 58. Thereupon compressed air is admitted to the cylinder 112 through the inlet 114 to push up the piston 115 to eject the tip 63 from the counterbore 111 and disposed its upper end in the tip holder within the cavities 61 and 62. Thereupon the clamping jaw 60 is moved toward the left, viewing Figure 5, to clamp the tip in the tip holder. When the tip is so clamped its lower surface just clears the upper surface of the slide 87 and the slide returns to its retracted position to receive another tip for the succeeding cycle. Retraction of the slide 87 is effected by admitting compressed air into the cylinder 91 through the inlet 103.

While the tip feeding mechanism above described is delivering a tip to the tip holder the table 2 is indexing. When the slide 87 has cleared the upper head 58 that head moves downwardly, carrying with it the tip 63 which has just been delivered thereto by the slide 87. The tip holder carries the tip down into contact with the lubrication fitting body held by the work holder 4 positioned at the welding station. The tip engages the fitting body coaxially with the lubricant delivery passage which has been drilled into the fitting body at the drilling station. The tapered lower end 65 of the tip enters the upper end of the lubricant delivery passage in the bulbous head of the fitting body. Referring to Figure 7, the bulbous head of the fitting body is designated as 120 and the lubricant delivery passage therein which has been drilled at the drilling station is designated as 121. The passage 121 communicates with a longitudinal passage through the fitting body, as above explained. The passage 121 is cylindrical while the tip end 65 is tapered or frusto-conical. The largest diameter of the tapered tip end is somewhat greater than the diameter of the passage 121. On the other hand the smallest diameter of the tapered tip end is smaller than the diameter of the passage 121. Thus the end of the tip enters the passage 121 as shown in full lines in Figure 7. The tip has substantially line contact with the fitting body where the tapered tip end engages the mouth of the passage 121.

With the tapered tip end 65 inserted into the passage 121 as shown in full lines in Figure 7 and with the tip pressed downwardly against the fitting body the tip is welded to the body. The upper head 58 acts as the upper welding electrode, current passing through it to complete the welding circuit. A lower welding electrode 122 is moved radially inwardly to engage the end of the fitting body during welding so that current passes through the upper head or electrode 58, the tip 63, the fitting body 123 shown in Figure 2 and the electrode 122. As soon as the current is turned on metal at the zone of the mouth of the passage 121 melts. Melting of that metal allows the tip to be pushed somewhat farther into the passage 121 to about the position indicated by dotted lines in Figure 7. The current is only on for a few cycles, perhaps three cycles or one-twentieth of a second. That is sufficient to melt the metal at the mouth of the passage 121 which is at the zone of contact between the tip and the fitting body. As has been indicated, the melting of the metal allows the tip which is being pressed downwardly, viewing Figure 2, to enter the passage 121 somewhat farther than originally. When the welding current circuit is opened the melted metal solidifies and forms a strong continuous permanent weld between the fitting body and tip as above explained.

Upon completion of the weld the electrode 122 is withdrawn and the upper head 58 releases the tip and is retracted upwardly and the table 2 indexes forward 30° for another cycle.

As has been explained above, all of the stations 5, 6, 7, 8, 9 and 10 are operative upon each dwell of the table 2. Thus completed tips are in work holders 4 which simultaneously reach the ejecting stations 11 and 12. As those work holders reach the ejecting stations the plunger 43 of the air valve controlling them rides off of the end of the cam 13 cutting off air to the cylinders 33 of those two work holders, permitting the springs 29 to open them. When the two work holders are open the finished tips are ejected from them by blasts of compressed air delivered through ejector tubes 124, one at each of the ejecting stations 11 and 12. The finished fittings are blown radially outwardly into receptacles which catch them.

After the finished fittings have been ejected the table 2 continues to index in steps of 30° in a clockwise direction, viewing Figure 1. Before the air valve 45 controlling each pair of work holders 4 again comes to the front end of the stationary cam 13 lubrication fitting bodies are positioned in the work holders. This may be done manually or by the use of suitable feeding mechanism. Then when each air valve 45 is opened by engagement of its plunger 48 with the cam 13 the fitting bodies positioned in the two work holders controlled by that air valve are clamped ready for drilling and welding as above explained.

Figure 6:
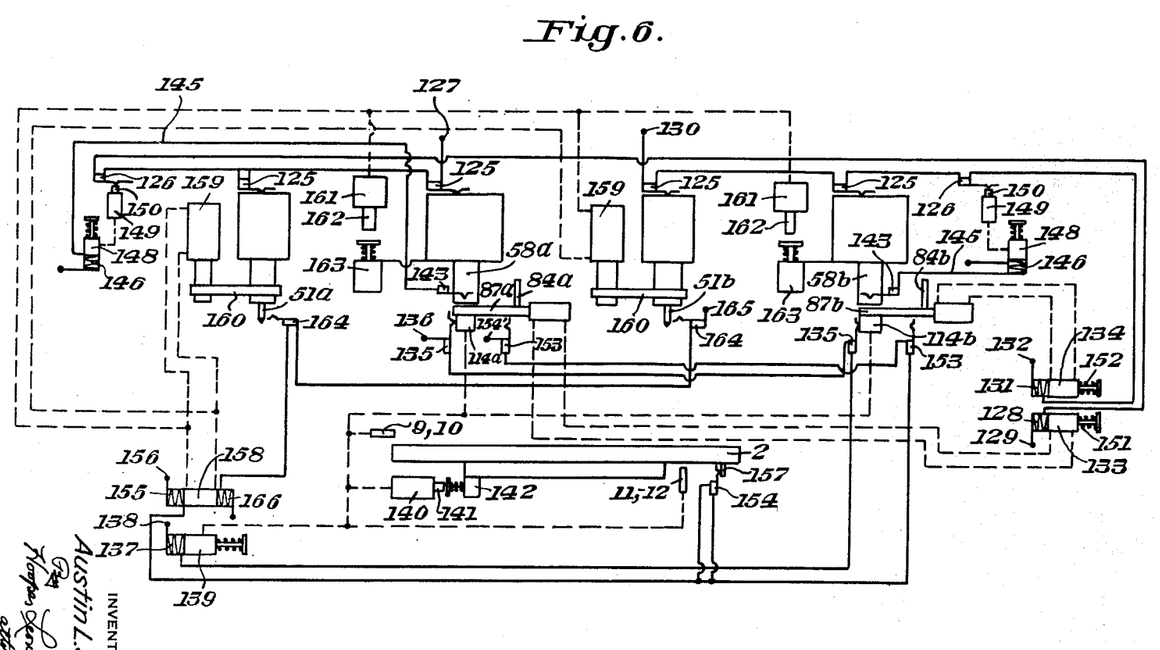
Figure 6 is a control diagram showing the control mechanism for the apparatus.

The operation of the apparatus will now be described, reference being had primarily to Figure 6. In that figure the two drills are designated respectively 51a and 51b, the two tip holders or upper welding heads are designated respectively 58a and 58b, the two tip feeders or slides are designated respectively 87a and 87b, the two hopper tubes are designated respectively 84a and 84b and the two inlets for air to eject tips from the feeders are designated respectively 114a and 114b. The table is shown at 2. The control mechanism will be described in connection with the description of a cycle of operation of the apparatus.

At the beginning of a cycle the table 2 is stationary with the work holders in the positions which they occupied during the operating portion of the preceding cycle, the drills and tip holders are in their upper or raised positions and the tip feeders or slides are in their retracted positions. Since the drills and tip holders are up normally open switches 125 are closed, being held closed thereby. Also normally closed switches 126 are closed, current flowing from line terminal 127 through the two left-hand switches 125, viewing Figure 6, and the left-hand switch 126 to the solenoid 128 and thence to line terminal 129 to complete the circuit. Current flows from line terminal 130 through the two right-hand switches 125, viewing Figure 6, and the right-hand switch 126 to the solenoid 131 and thence to line terminal 132 to complete the circuit. The solenoids 128 and 131 operate air control valves 133 and 134 respectively to admit air under pressure to the right-hand ends of the cylinders for operating the tip feeders 87a and 87b, resulting in movement of the tip feeders to the left. As the two tip feeders approach their extreme left-hand positions in which tips are disposed directly below the tip holders 58a and 58b switches 135 are closed thereby. This causes current to flow from line terminal 136 through the two switches 135 and solenoid 137 to line terminal 138, energizing solenoid 137 to open air control valve 139 and deliver compressed air (1) to inlets 114a and 114b to eject the tips from the feeders into the respective tip holders or upper heads 58a and 58b (2) to the clean-out stations 9 and 10, (3) to the two ejector stations 11 and 12 and (4) to an air cylinder 140 to actuate a plunger 141 to operate a table control 142 which causes forward indexing of the table 2 one step or through an angle of 30°. The mechanism for moving the table does not constitute my invention and any suitable mechanism for that purpose may be used. The mechanism will be such, as known in the art, that when the table has indexed 30° to its new position it will stop and remain in that position until the table control 142 has been released and again operated.

Admission of fluid to the inlets 114a and 114b ejects the tips from the tip feeders 87a and 87b into the tip holders 58a and 58b respectively. Each of the tips when thus pushed up into the corresponding tip holder closes a switch 143. The closing of each of the switches 143 results in the passage of current from a line terminal 144 (see Figure 5) to a line 145. From each line 145 current passes (1) to a solenoid 146 and (2) to a solenoid 147. Each of the solenoids 146 opens a valve 148 to admit compressed air to an air cylinder 149 to operate a plunger 150 to open one of the two normally closed valves 126. Each of the solenoids 147 is energized to open one of the air valves 81 (see Figure 5) to admit air under pressure to the corresponding cylinder 73 to the right of the corresponding piston 74, viewing Figure 5, to clamp the tip in place in the tip holder.

Opening of the switches 126 results in de-energizing of solenoids 128 and 131 whereupon springs 151 and 152 respectively operate air control valves 133 and 134 to admit air under pressure to the left-hand ends of the respective cylinders which operate the tip feeders, resulting in retraction of the tip feeders to their right-hand positions. Upon each tip feeder reaching its right-hand position a tip drops by gravity from the corresponding hopper tube into the corresponding counterbore 111 as above described. As the respective tip feeders approach their extreme right-hand positions they close switches 153 resulting in current flowing from line terminal 154' through the two closed switches 153 and through the closed switch 154 to the solenoid 155 and line terminal 156. The switch 154 is closed when the table 2 after having indexed in response to the table control 142 reaches its new operative or dwell position. The table carries twelve pins 157 equally spaced peripherally thereof, and upon reaching each dwell position one of those pins closes the switch 154. While the table is moving intermediate its dwell positions the switch 154 is open, preventing energizing of the solenoid 155. Thus in order to energize solenoid 155 it is necessary for both of the tip feeders to be in their retracted positions and for the table 2 to have reached its dwell position for the succeeding operative portion of the cycle.

Energization of the solenoid 155 operates an air valve 158 to admit compressed air to the upper ends of air cylinders 159. The air cylinders 159 are connected with the respective drills 51a and 51b through mechanism shown diagrammatically at 160. Admission of air under pressure to the upper ends of air cylinders 159 causes downward movement of the drills 51a and 51b. It is to be understood that the two drills are rotating continuously during operation of the apparatus.

Opening of air valve 158 also causes delivery of compressed air to air cylinders 161 to operate plungers 162 to close switches 163 to deliver current to the tip holders or upper welding heads 58a and 58b. These may be standard commercial devices and do not per se constitute my invention. Upon delivery of current to each such device the tip holder moves downwardly and presses the tip held thereby against the lubrication fitting body held by the work holder at the welding station, welding current passes through the parts to be welded together, the parts are pressed and held together during application of welding current and after the welding current has been shut off to insure a perfect weld and the tip holders or upper welding heads are raised to their upper positions (the positions which they occupied at the beginning of the cycle).

As the drills 51a and 51b move downwardly they drill lubricant delivery passages in the lubrication fitting bodies held by the work holders at the drilling stations. As each drill reaches the limit of its downward movement (i. e., when the lubricant delivery passage formed by the drill intersects the axial passage in the fitting body) switches 164 are closed, resulting in flow of current from line terminal 165 through the two closed switches 164 to solenoid 166. Energization of solenoid 166 causes operation of air control valves 158 to shut off compressed air to the tops of air cylinders 159 and to deliver compressed air to the bottoms of those cylinders. This results in upward movement of the drills to their initial positions.

When the drills and tip holders reach their upper positions they close switches 125 and the parts are in the same position as they occupied at the beginning of the cycle.

While I have shown and described certain present preferred embodiments of the invention it is to be distinctly understood that the invention is not limited thereto but may be otherwise variously embodied within the scope of the following claims.

I claim:

1. Apparatus for making lubrication fittings comprising a work holder and a welder to which the work holder is adapted to present a portion of a lubrication fitting body held by the work holder to be acted upon by the welder, the welder including an electrode separate from the work holder for engagement with the lubrication fitting body held by the work holder, a second work holder for holding a tip to be welded to the body, means for advancing the second work holder to press the tip against the body and means for passing an electric current through the tip and body and said electrode while the tip is being pressed against the body to weld the tip to the body.

2. Apparatus for making lubrication fittings comprising a series of work holders, a welder, means for moving the work holders to bring them successively into cooperative relationship with the welder to present portions of lubrication fitting bodies held respectively by the work holders to be acted on by the welder, the welder including an electrode for engagement with the lubrication fitting body held by each work holder when disposed in cooperative relationship with the welder, a tip holder for holding tips to be welded to the respective lubrication fitting bodies, means for advancing the tip holder relatively to each work holder when the latter is in cooperative relationship with the welder to press a tip held by the tip holder against the lubrication fitting body held by the work holder and means for passing an electric current through each such assembled tip and body and said electrode while the tip is being pressed against the body to weld the tip to the body.

3. Apparatus for making lubrication fittings comprising a series of work holders, a welder, means for moving the work holders to bring them successively into cooperative relationship with the welder to present portions of lubrication fitting bodies held respectively by the work holders to be acted on by the welder, the welder having a movable electrode advanceable to engage each lubrication fitting body when the latter is in position to be acted upon by the welder, a tip holder for holding tips to be welded to the respective lubrication fitting bodies, means for advancing the tip holder relatively to each work holder when the latter is in cooperative relationship with the welder to press a tip held by the tip holder against the lubrication fitting body held by the work holder and means for passing an electric current through each such assembled tip and body while the tip is being pressed against the body to weld the tip to the body.

4. Apparatus for making lubrication fittings comprising a series of work holders, a welder, means for moving the work holders to bring them successively into cooperative relationship with the welder to present portions of lubrication fitting bodies held respectively by the work holders to be acted on by the welder, each work holder being angularly movable to present selected differently oriented portions of the lubrication fitting body held thereby to be acted on by the welder, a tip holder for holding tips to be welded to the respective lubrication fitting bodies, means for advancing the tip holder relatively to each work holder when the latter is in cooperative relationship with the welder to press a tip held by the tip holder against the selected portion of the lubrication fitting body held by the work holder and means for passing an electric current through each such assembled tip and body while the tip is being pressed against the body to weld the tip to the body.

5. Apparatus for making lubrication fittings comprising a series of work holders, a welder, means for moving the work holders to bring them successively into cooperative relationship with the welder to present portions of lubrication fitting bodies held respectively by the work holders to be acted on by the welder, a tip holder movable toward the lubrication fitting body held by each work holder when in cooperative relationship with the welder to place a tip in position to be welded to that body and retractable therefrom intermediate welding operations, the welder having means for welding together each such assembled body and tip, and a tip feeder movable relatively to the tip holder delivering tips to the tip holder intermediate welding operations.

AUSTIN L. STALEY.

References Cited in the file of this patent

UNITED STATES PATENTS

| Number | Name | Date |
|---|---|---|
| 1,792,051 | Valentine | Feb. 10, 1931 |
| 1,997,694 | Morick | Apr. 16, 1935 |
| 2,005,375 | Jones et al. | June 18, 1935 |
| 2,006,459 | Jones et al. | July 2, 1935 |
| 2,007,698 | Tear | July 9, 1935 |
| 2,028,225 | Carson | Jan. 21, 1936 |
| 2,052,356 | Long | Aug. 25, 1936 |
| 2,078,694 | Smith | Apr. 27, 1937 |
| 2,154,243 | Langhans | Apr. 11, 1939 |
| 2,269,658 | George | Jan. 13, 1942 |
| 2,302,878 | Muhl et al. | Nov. 24, 1942 |
| 2,338,002 | Mero | Dec. 28, 1943 |
| 2,370,828 | Widmont | Mar. 6, 1945 |
| 2,388,754 | Martindell | Nov. 13, 1945 |
| 2,390,596 | Larsen | Dec. 11, 1945 |
| 2,419,484 | Danzinger | Apr. 22, 1947 |